United States Patent

[11] 3,546,423

[72] Inventors John A. Chopp
Lake Jackson, Texas;
Morrough O'Brien, Boulder; Mack O. Roberts, North Glen; Hubert Scholz, Arvada, Colorado
[21] Appl. No. 789,575
[22] Filed Jan. 7, 1969
[45] Patented Dec. 8, 1970
[73] Assignee To the United States of America as represented by the United States Atomic Energy Commission

[54] WELD WIRE FEED CONTROL
1 Claim, 2 Drawing Figs.
[52] U.S. Cl. .................................................. 219/130,
219/131, 314/68, 314/78, 314/104
[51] Int. Cl. .................................................. B23k 9/00
[50] Field of Search .......................................... 219/69(G),
74, 130, 131, 136, 137; 314/67, 68, 78, 104, 105, 115, 116, 119

[56] References Cited
UNITED STATES PATENTS

| | | | |
|---|---|---|---|
| 1,571,924 | 2/1926 | Kenyon .......................... | 314/67X |
| 2,761,050 | 8/1956 | Ballhausen ..................... | 219/69 |
| 2,809,280 | 10/1957 | Van Der Willigen et al.. | 219/131X |
| 2,901,588 | 8/1959 | McKechnie .................... | 219/69 |
| 2,939,065 | 5/1960 | Matulaitis...................... | 219/69X |
| 3,270,179 | 8/1966 | Russell ........................... | 219/74 |

*Primary Examiner*—J. V. Truhe
*Assistant Examiner*—C. L. Albritton
*Attorney*—Roland A. Anderson ABSTRACT: A welding apparatus comprising rollers driven through a clutch to feed weld wire to a workpiece, electrical means for detecting an arc between the wire and workpiece and engaging the clutch on arc initiation such that weld wire feed rate is rapidly accelerated to equilibrium velocity and substantially synchronized with said arc initiation.

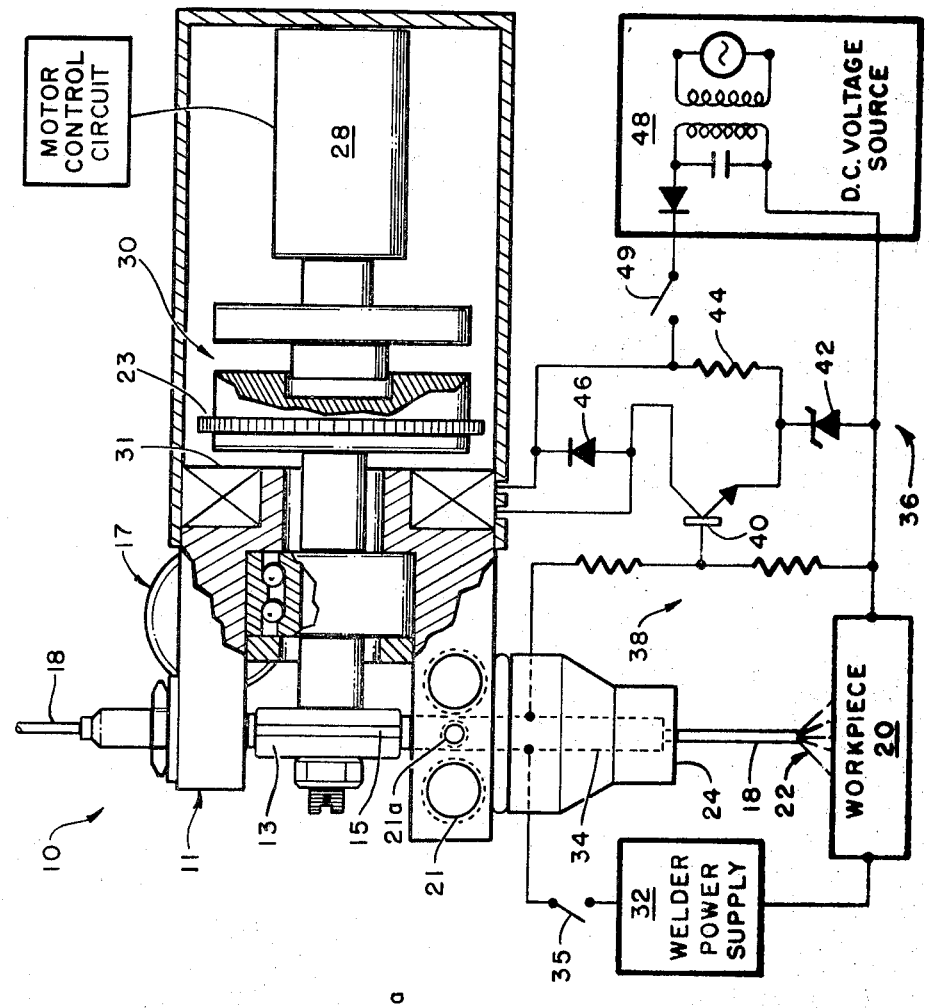
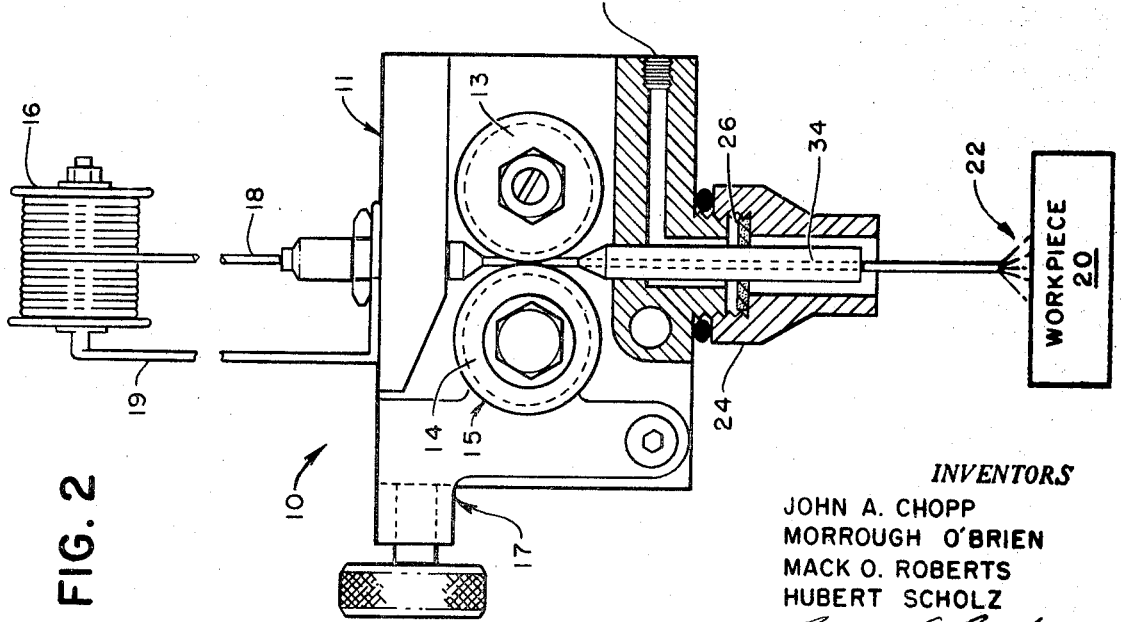
INVENTORS
JOHN A. CHOPP
MORROUGH O'BRIEN
MACK O. ROBERTS
HUBERT SCHOLZ
BY

WELD WIRE FEED CONTROL

BACKGROUND OF INVENTION

In arc welding operations where a consumable electrode is utilized, it may be desirable to maintain a constant arc length with the electrode or weld wire slightly spaced from the workpiece. This is an especially difficult problem at the beginning of a weld when weld wire feed and arc initiation are not necessarily synchronized. If arc initiation does not occur when the weld wire contacts the workpiece then excess weld wire may be fed onto the workpiece before welding begins. The excess wire may thereafter rapidly melt or even explode when arc initiation finally occurs, thereby causing undesirable splatter into the weld groove or onto the surrounding area. If the arc is initiated prior to the beginning of the wire feed, or if the wire feed rate is insufficient due to the acceleration time of the wire feed motor, then the preextended wire may be consumed to an extend which elongates the arc to produce instability or possible extinguishment. Either condition produces an inferior weld edge.

In many cases an initial weld edge may be cropped or removed if defective. However, where the area of the weld start is an integral part of the finished product such as circumferential welds around pipes, or other circular or cylindrical workpieces the defective weld edge remains and may not be readily removed.

In many welding operations, the arc is initiated by first advancing the weld wire into contact with the workpiece and subsequently electrically energizing both the arc voltage and the wire feed drive together. For instance, a single electrical contactor or relay may provide control voltage for both functions. Arc initiation may require as much as 5 to 50 milliseconds during which time unconsumed weld wire will advance onto the workpiece and may result in harmful splatter after the arc ignites. Conversely, if the wire feed drive is not energized until after arc initiation, there may be a delay due to inertia of as much as 200 milliseconds until the drive and wire feed reach full operating speed. Such weld wire lag may also produce a defective weld at initiation as explained above.

SUMMARY OF INVENTION

Therefore it is an object of this invention to provide an apparatus for synchronizing weld wire feed with arc initiation.

It is a further object to provide an apparatus for rapidly accelerating a weld wire to equilibrium velocity, that is at a weld wire feed rate substantially the same as the weld wire consumption rate, as soon as arc initiation occurs.

It is also an object to provide an apparatus for producing closed curve welds without defects at the point of curve closure.

Various other objects and advantages will appear from the following description and illustration of one embodiment of the present invention.

The invention comprises a welding apparatus including a roller device for advancing weld wire towards a workpiece, a power operated clutch for coupling and decoupling the roller device to an operating motor or drive mechanism, and electrical circuitry for sensing an arc at the workpiece and operating the clutch in response thereto.

DESCRIPTION OF DRAWINGS

The present invention is illustrated in the following drawings wherein;

FIG. 1 is an elevation view, partially in cross section, of a welding apparatus and an electrical schematic of an arc sensing circuit.

FIG. 2 is a side elevation view, partially in cross section, of a portion of the welding apparatus of FIG. 1.

DETAILED DESCRIPTION

Referring to FIG. 1 and 2, a welding apparatus 10 is shown having a housing or support 11 for carrying the wire feeder and torch components. A drive roller 13 may engage an idler or bearing roller 14 at their circumferential surfaces for receiving a weld wire 18 therebetween and advancing it towards a workpiece 20. Weld wire 18 may be stored on a roll 16 supported by a suitable bracket 19 which may be mounted on welder housing 11. The rollers 13 and 14 may each be provided with a circumferential groove or slot 15 which may be contoured and roughened to fit firmly against and grip weld wire 18 for facilitating transfer of thrust from the rollers to the weld wire. If desired the rollers may be slightly spaced apart rather than contiguous as shown so long as there is sufficient friction between the wire and rollers through grooves 15 to avoid slippage. Access to weld wire 18 and grooves 14 may be achieved by rotatably mounting roller 14 on a movable arm 17 pivotally mounted on housing 11. Arm 17 may be adjusted and roller 14 suitably positioned by a hand wheel, as shown. There may also be provided suitable mechanical means such as a hand wheel or ring 23 engaging the shaft of roller 13 for manually rotating the roller and advancing weld wire 18.

The housing 11 may be provided with suitable ports 21 for ingress and egress of a coolant fluid for cooling housing 11. Another port 21a may be provided for entry of a shielding gas for shrouding the workpiece 20 and molten weld metal during welding. The shielding gas may be directed towards the weld arc 22 and workpiece 20 through a nozzle or conduit 24 which may encompass weld wire 18 and carry a gas diffusion screen or filter 26 for filtering the inert gas.

Power may be supplied for the welding operation through a conventional welder power supply, shown diagrammatically at 32. Power supply 32 may be controlled by a suitable contactor or switch 35 interposed electrically between the power supply 32 and the weld wire 18. Electrical connection from the welder power supply 32 to the weld wire 18 may be made through a suitable electrical conductor electrically joined to a contacting member 34 which encompasses and electrically contacts weld wire 18. Contacting member 34 may be an elongated electrically conductive cylinder having a precise axial bore of sufficient diameter to allow the weld wire 18 to pass through freely yet fitting sufficiently snug about the weld wire to minimize arcing while making electrical connection therebetween.

The drive roller 13 may be powered by a suitable drive 28 such as a gearhead motor or a conventional motor coupled to a gear reducer of appropriate ratio. If desired, a variable speed drive may be used to allow adjustment of weld wire feed rate to fit the welding operation required. Conventional motor control circuitry and devices may be provided to control and supply power to drive 28.

A normally disengaged power operated clutch 30 may be joined through shafting and conventional bearings to the drive 28 and to the drive roller 13 for coupling and decoupling these elements. The clutch 30 may be any suitable commercially available type operated by an electromagnetic coil, shown schematically as 31, which may operate against a spring bias (not shown). Other type clutches, for instance those adapted for pneumatic or hydraulic operation, may also be used.

Clutch 30, with electromagnetic coil 31, may be controlled and operated by arc sensing circuiting 36. A direct current voltage source 48 for providing power to the arc sensing circuit may be connected in series with clutch coil 31 and a switching element 40 through a suitable switch 49. Voltage source 48 may be rectified and filtered power supply as schematically shown or a suitable storage battery or the like.

The switching element 40 may be a transistor, or a vacuum or gas discharge tube depending on circuit requirements. The base or control electrode of switching element 40 may be connected to a voltage tap of a voltage divider 38 which may be two resistors connected in series or a variable potentiometer with a sliding contact. The extremities of voltage divider 38 may be connected to contacting member 34 and to workpiece 20 such that an appropriate fraction of the voltage drop across arc 22 may be sensed at the base of switching element 40. The emitter and collector, or other electrodes of switching element 40, may be individually connected to clutch coil 31 and to a voltage regulator 42 which may be in series with and intermediate to a terminal of voltage source 48 and switching element 40.

Voltage regulator 42, such as a Zener diode, may also be connected from the junction between switching element 40 and itself to the other terminal of voltage source 48 through a resistor 44 and switch 49. Resistor 44 provides a limited current flow through regulator 42 when switching element 40 is not conducting. A suitable regulated voltage bias is thereby established at the emitter (or collector in differently arranged circuits) to facilitate switching of element 40 to a conducting state when an arc voltage is sensed through voltage divider 38.

A rectifier or diode 46 may be connected electrically in parallel with clutch coil 31 to short out reverse voltage excursions or voltage spikes generated within coil 31 when it is deenergized.

Devices other than the arc sensing circuitry 36 may be used to energize clutch coil 31 when arc 22 has been initiated. For instance a photoelectric cell or photomultiplier tube may be used to sense or recognize arc initiation and transmit an electrical response either directly to clutch coil 31 or to an amplifier for driving the clutch coil.

The welding apparatus 10 and arc sensing circuitry 36, as shown, may be operated by first activating drive 28 with clutch 30 uncoupled or disengaged to permit the drive to reach the desired rate of rotation. Weld wire 18 may be advanced manually until it contacts workpiece 20 by rotating wheel or ring 17. Switch 49 may be closed to supply power, which may typically be about 30 volts from voltage source 48, to activate the arc sensing circuitry. Switch 35 may then be closed to apply welding current through weld wire 18 and workpiece 20. Initially there will be no arc and only a small voltage drop reflected across voltage divider 38. After about 5 to 50 milliseconds have elapsed sufficient weld wire will burn away for an arc 22 to be initiated. A voltage drop across arc 22, typically about 20 volts, may be imposed on voltage divider 38 such that a desired voltage, such as about 6 volts, may develop between the base of switching element 40 and workpiece 20 to turn on switching element 40. Switching element 40 may then begin to conduct and energize clutch coil 31 such that clutch 30 engages and couples drive roller 13 to the already rotating drive 28. The drive and bearing rollers 13 and 14 will then begin feeding weld wire 18 into the arc 22 at the full operating rate at equilibrium welding velocity substantially simultaneously with arc initiation due to the kinetic energy of the already rotating drive. Should arc 22 be extinguished by disconnecting the welder power supply 32, the base voltage will return to zero and switching element 40 will be switched to the nonconducting state to disengage clutch 30.

The welding apparatus of the present invention allows weld wire feed to begin at full operating speed at equilibrium welding velocity as soon as an arc has been initiated. Excess weld wire is not extended prior to arc initiation which would splatter and impair the initial weld edge, nor is the weld wire feed delayed after arc initiation which may cause arc elongation and extinguishment. This invention is especially useful where a circumferential or circular weld is to be made or any application where the initial weld edge may not be cropped or removed.

It will be understood that various changes in the details, materials and arrangements of the parts, which have been described to explain the invention, may be made by those skilled in the art within the principles of the invention as expressed in the claims.

We claim:

1. A welding apparatus for synchronizing feed of weld wire to a workpiece and arc initiation comprising a support member, roller means rotatively carried by said support member for advancing said weld wire towards said workpiece, drive means for rotating said roller means, normally disengaged electromagnetic clutch means with electrically energizable magnetic coil intermediate said drive and roller means for coupling and decoupling thereof, means for energizing said drive means to bring said drive means to operating speed, means for electrically initiating an arc between said weld wire and workpiece after said drive means is at its operating speed and electrical means for sensing arc initiation and engaging said clutch means in response thereto, said electrical means including a source of direct current voltage, a voltage divider connected in electrical parallel to said arc, a transistor having a pair of electrodes connected in series with said magnetic clutch coil and a control electrode electrically connected to said voltage divider for switching said transistor from the nonconducting state to the conducting state at the initiation of said arc, and a voltage regulator means connected to said transistor opposite said clutch coil for providing a voltage bias at one of said pair of electrodes and facilitating switching of a said transistor.